No. 741,714. PATENTED OCT. 20, 1903.
E. C. RADICK.
ARMOR FOR PNEUMATIC TIRES.
APPLICATION FILED AUG. 7, 1903.
NO MODEL.
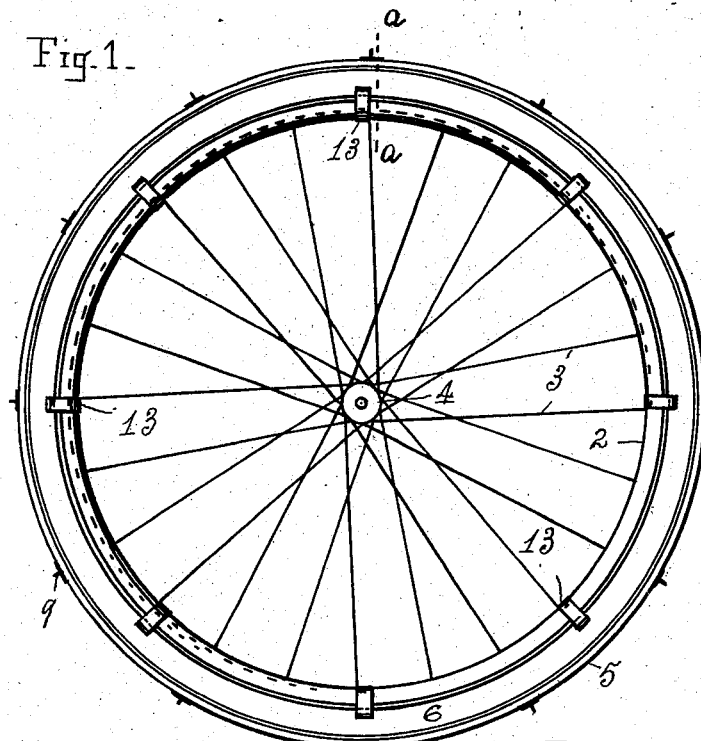
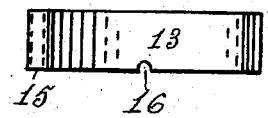
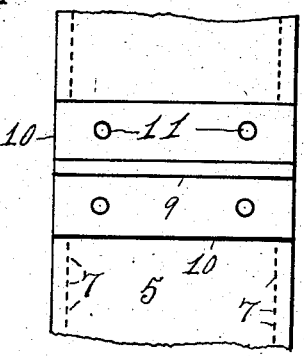
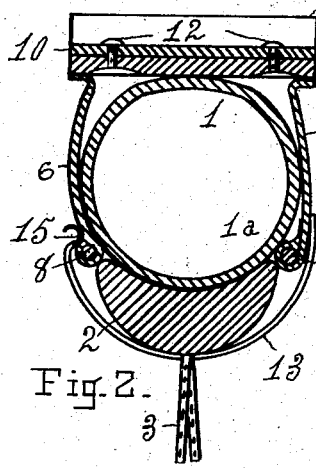
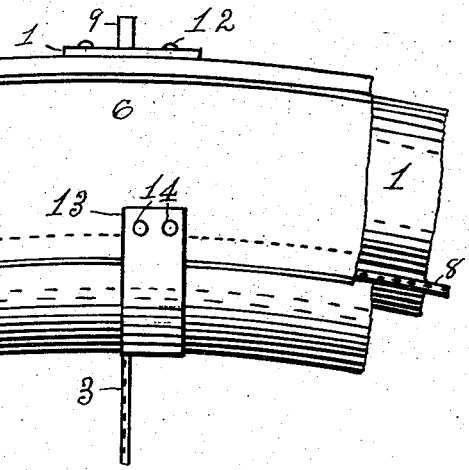
WITNESSES:
Wm. E. Nash.
E. M. Albee.
INVENTOR
Emil C. Radick
BY
G. H. Albee.
ATTORNEY No. 741,714.

Patented October 20, 1903.

UNITED STATES PATENT OFFICE.

EMIL C. RADICK, OF MENASHA, WISCONSIN.

ARMOR FOR PNEUMATIC TIRES.

SPECIFICATION forming part of Letters Patent No. 741,714, dated October 20, 1903.

Application filed August 7, 1903. Serial No. 168,567. (No model.)

*To all whom it may concern:*

Be it known that I, EMIL C. RADICK, a citizen of the United States, residing at Menasha, in the county of Winnebago and State of Wisconsin, have invented a new and useful Improvement in Armor for Rubber or other Pneumatic Tires for Vehicle-Wheels, of which the following is a specification.

My invention relates to a protective covering for rubber or other pneumatic tired wheels and also to ice-spurs, which are attached to said covering, its object being to provide a protective covering for use upon the wheels of bicycles, automobiles, buggies, and other vehicles that is adapted to lengthen the life of the wear of the rubber or other tires thereon and also to assist in the traction of said wheels upon ice or frozen surfaces. The covering being applied to wheels used on frozen ground, the danger of the tires being punctured thereby is almost entirely avoided, my improvement being illustrated in the accompanying drawings, in which—

Figure 1 is a side elevation of a bicycle-wheel having my improved armor applied to it. Fig. 2 is a transverse section of the wheel-rim, its tire, and the armor upon the line $a\,a$ of Fig. 1. Fig. 3 is a side view of a short section of the wheel-rim and showing the felly, the tire, the armor, the wire ring for holding the armor upon the tire, and a spring-holder for holding the entire covering in position upon the wheel-rim. Fig. 4 is a plan of one of the ice-engaging spurs and a short section of the circumferential armor. Fig. 5 is an inside view of a spring-holder for retaining the tire-armor in position upon the inflated tire. Fig. 1 is upon a smaller scale than the others.

Similar numerals indicate like parts in the several views.

1 indicates the inflatable tire; 2, the felly; 3, spokes, and 4 the hub. The armor-covering consists of a strip of leather or some flexible material that is adapted to withstand the wear to which it will be exposed and to which the ice-engaging spurs can be riveted formed into a ring 5 of a diameter adapted to inclose the inflated tire and having the two side curtains 6 sewed, as indicated, by stitches 7 or otherwise secured to the outer side edges of it, each curtain extending inward a sufficient distance for being doubled back upon itself around a wire ring 8 and its inner edge sewed or otherwise secured to the curtain.

Upon the outer surface of the outer ring spurs 9, formed of short pieces of angle-iron, are secured at intervals by riveting said pieces to the ring 5, said intervals being of any desired length. These spurs are preferably made of sections of angle-iron, one angle forming the spur and the opposite flanges 10 being provided with suitable holes 11, through which the rivets 12 are to be inserted.

When the wire rings are sewed into the curtains 6, the inner edges of the curtain should rest upon the outer edge of the felly at the point of the groove $1^a$ where the tire 1 and felly 2 join, and thereby assist in holding the armor in position over the tire 1. In applying the armor to a wheel the tire is to be deflated and the wire ring of one side worked over the tire into the position it is to occupy, when the tire can be inflated and the armor held in position by said inflated tire.

For holding the armor more securely upon the pneumatic tire whenever the roads upon which the vehicle is used require it numerous spring-holders 13 are provided, said holders being made of a thin strip of spring metal bent into a nearly half-circle, one end thereof being secured with rivets 14 or otherwise to one of the curtains 6 and the other end bent into a small curve 15 for engaging the other curtain just over the wire ring 8, the holder being so shaped as to be sprung over said wire and be held in position thereon by the resiliency of the material of which the holder is formed. A slot 16 is provided in one edge of the holder for engaging a spoke of the wheel should a connection between the holder and spoke be desired. These holders may be applied in such numbers as may be found necessary for holding the armor in position, and the slots 16 may be connected with the spokes upon either side thereof. The holders being secured to the flexible curtain at one end, each one can be sprung one at a time around the felly of the wheel, the slot 16 engaged with a spoke, and the curved end 15 sprung into position over the wire ring 8.

It will be evident that in four-wheeled vehicles, even if the roads are in such a condition as to require the armor-covering upon the wheels, the spurs upon each of said four wheels will not be essential.

Having described my invention, what I claim, and desire to secure by Letters Patent, is—

1. An armor for pneumatic-tired wheels, consisting of an outer ring of leather, or other suitable material, of a diameter and width adapted for inclosing the tire of the wheel when inflated, a curtain secured to each edge of said ring and extending inward at nearly a right angle with said ring, and a wire ring secured to the inner edge of each curtain of a diameter corresponding substantially with the diameter of the groove which is formed by the meeting of the tire and felly at each side of said wheel, substantially as described.

2. An armor for pneumatic-tired wheels, consisting of an outer ring of leather, or other suitable material, of a diameter and width adapted for inclosing the tire of the wheel when inflated, a curtain secured to each edge of said ring and extending inward at nearly a right angle with said ring, a wire ring secured to the inner edge of each curtain of a diameter corresponding substantially with the diameter of the groove which is formed by the meeting of the tire and felly at each side of said wheel, and a series of spurs secured to said outer ring at intervals, around the armor, for engaging ice or frozen surfaces, substantially as set forth.

3. An armor for pneumatic-tired wheels, consisting of an outer ring of leather, or other suitable material, of a diameter and width adapted for inclosing the tire of the wheel when inflated, a curtain secured to each edge of said ring and extending inward at nearly a right angle with said ring, a wire ring secured to the inner edge of each curtain of a diameter corresponding substantially with the diameter of the groove which is formed by the meeting of the tire and felly at each side of said wheel, and a series of spring-holders, one end of each of which is secured to one of the curtains of said outer armor and the other end made into a suitable form for engaging the other curtain just over its wire ring, said holder being of such form and resiliency as to be sprung into position around the wheel-felly and over the wire of said last-named curtain, and thereby retain said armor in position, substantially as described.

4. A holder for an armor-covering upon pneumatic-tired wheels formed of a strip of spring metal bent into a nearly semicircular form, one end of which is adapted to be secured to said armor at one side of the wheel, and the other end adapted to be held in contact with the armor upon the other side of the wheel by the form and resiliency of said holder, substantially as set forth.

5. In a holder for an armor-covering upon pneumatic-tired wheels formed of a strip of spring metal bent into a nearly semicircular form, one end of which is adapted to be secured to said armor at one side of the wheel, and the other end adapted to be held in contact with the armor upon the other side of the wheel by the form and resiliency of said holder, a slot intermediate the ends of said holder, arranged in position for engaging a spoke of said wheel, substantially as described.

EMIL C. RADICK.

Witnesses:
W. G. BROWN,
H. C. HELTON.